(No Model.)
C. M. FOWLER.
GRIDDLE CAKE OR FOOD TURNER.
No. 593,881. Patented Nov. 16, 1897.
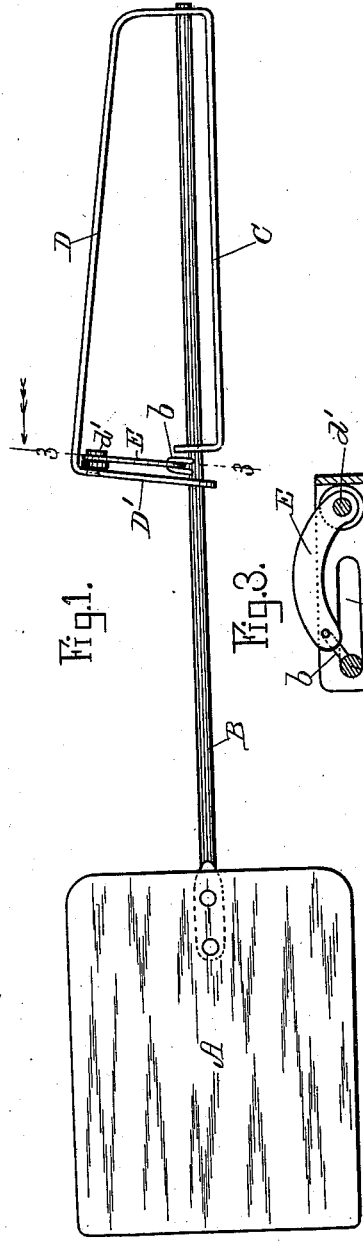
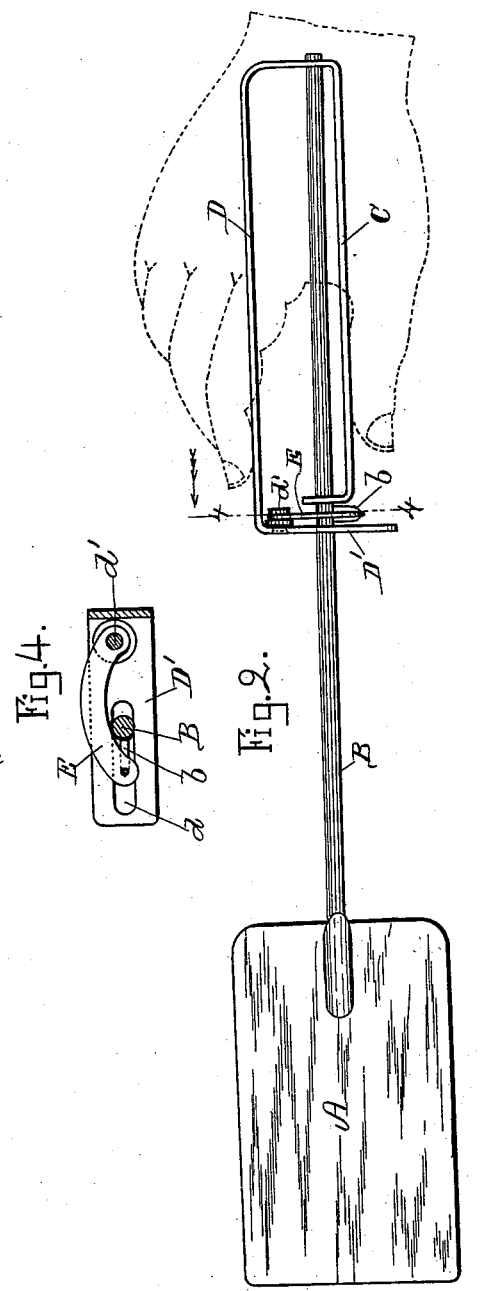
Witnesses.
Lauritz N. Möller
Henry R. Page
Inventor
Charles M. Fowler
by Urban Andrew
his atty.

UNITED STATES PATENT OFFICE.

CHARLES M. FOWLER, OF WORCESTER, MASSACHUSETTS.

GRIDDLE-CAKE OR FOOD TURNER.

SPECIFICATION forming part of Letters Patent No. 593,881, dated November 16, 1897.

Application filed April 10, 1897. Serial No. 631,521. (No model.)

*To all whom it may concern:*

Be it known that I, CHARLES M. FOWLER, a citizen of the United States, and a resident of Worcester, in the county of Worcester and State of Massachusetts, have invented new and useful Improvements in Griddle-Cake or Food Turners, of which the following, taken in connection with the accompanying drawings, is a specification.

This invention relates to improvements in griddle-cake or food turners for the purpose of readily turning over cakes or food during the frying or broiling operation, as will hereinafter be more fully shown and described, reference being had to the accompanying drawings, wherein—

Figure 1 represents a top plan view of the invention shown in normal position. Fig. 2 represents a similar top plan view showing the expansive handle compressed and the blade turned during the operation of turning over the food. Fig. 3 represents a cross-section on the line 3 3 shown in Fig. 1, and Fig. 4 represents a cross-section on the line 4 4 shown in Fig. 2.

Similar letters refer to similar parts wherever they occur on the different parts of the drawings.

A represents the blade, secured to a shank or spindle B, which is journaled in the upper and lower ends of the stationary part C of the handle, as shown. In one piece with the handle C is made a yielding spring-bar D, terminating as a lateral guide D', provided with a slotted perforation $d$, adapted to receive the spindle B, as shown. To the guide D' is pivoted at $d'$ a link E, the other end of which is pivotally connected to a crank $b$, attached to or forming a part of the spindle B, as shown.

The operation is as follows: The operator takes hold lightly of the handle parts C D and slides the blade A under the cake or food and raises it up far enough to clear the pan, after which the operator compresses the yielding spring-bar D, as represented in Fig. 2, causing the link E, by its connection to the crank $b$ on the spindle or shank B, to rotate the latter and the blade A sufficiently to cause the cake or food to be turned over in a reversed position in the pan. After the food has been thus turned over the operator releases the grasp on the bar D, which is then caused to expand to the position shown in Fig. 1, by which the blade A automatically resumes its normal position, as represented in said Fig. 1.

The device may, if desired, be used as an ordinary cake or food turner for the purpose of lifting the cakes, &c., to examine their condition during the baking or cooking operation.

The device is very simple in construction and operation, is composed of very few parts, and by its means the food may be readily turned over while held on the blade simply by compressing the yielding portion of the handle without using any wrist motion, as is the case with the ordinary cake-turners, in which the handle is made rigid relative to the blade and its shank.

Having thus fully described the nature, construction, and operation of my invention, I wish to secure by Letters Patent and claim—

The herein-described cake or food turner, consisting in combination, a blade A, attached to a shank or spindle B, a stationary handle part C, in which said spindle is journaled, an expansive handle portion D, having a slotted guide D', for receiving the shank B, and a link E pivotally connected to the expansive portion of the handle and to a crank $b$, on the blade-shank substantially as and for the purpose set forth.

In testimony whereof I have signed my name to this specification, in the presence of two subscribing witnesses, on this 5th day of April, A. D. 1897.

CHARLES M. FOWLER.

Witnesses:
ALBAN ANDRÉN,
CHARLES A. HARRIS.